D. L. LEWIS.
PIPE COUPLING.
APPLICATION FILED SEPT. 25, 1911.
1,202,196.
Patented Oct. 24, 1916.
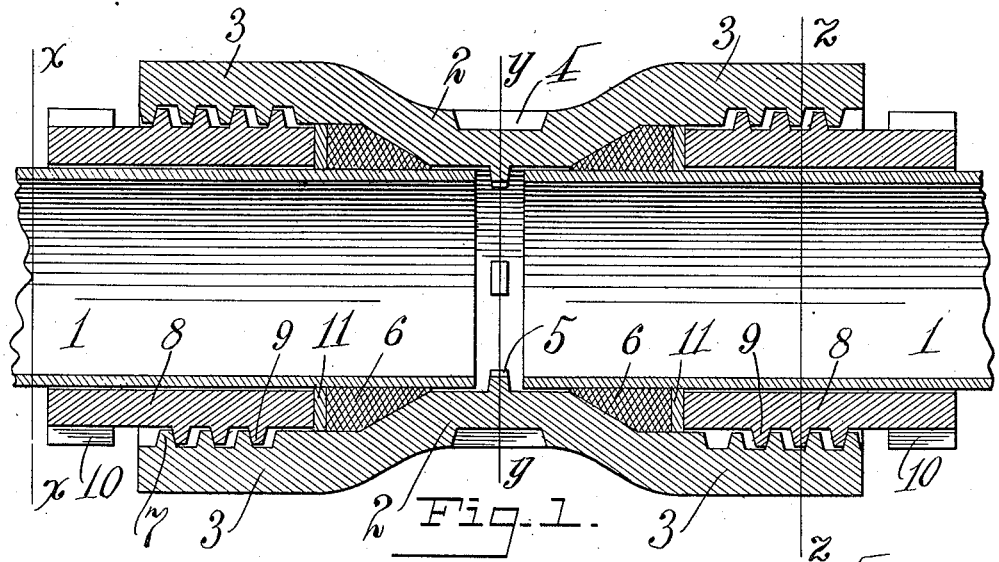
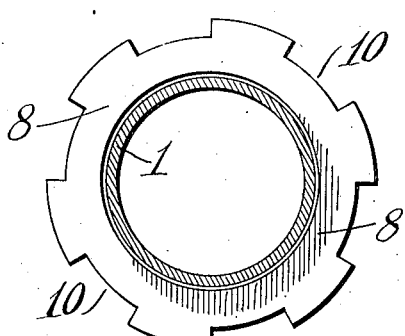
Fig. 2.
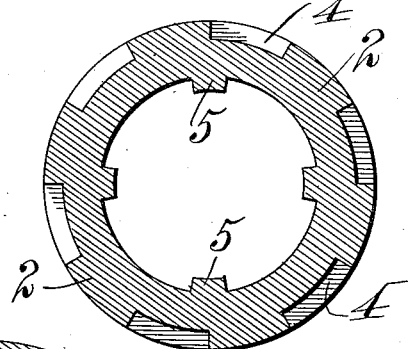
Fig. 3.
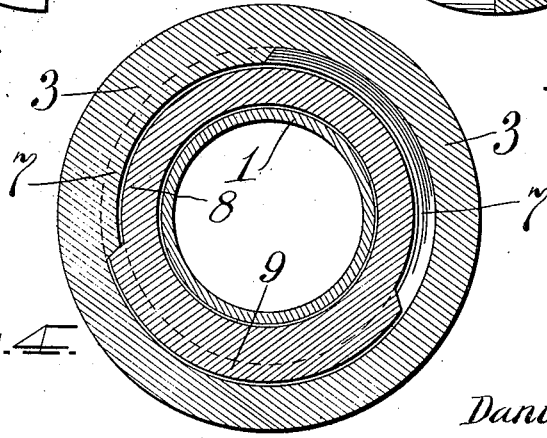
Fig. 4.
Inventor
Daniel L. Lewis.
Witnesses
By R. J. McCarty
his Attorney

UNITED STATES PATENT OFFICE.

DANIEL L. LEWIS, OF DAYTON, OHIO.

PIPE-COUPLING.

1,202,196.  Specification of Letters Patent.  Patented Oct. 24, 1916.

Application filed September 25, 1911. Serial No. 651,075.

*To all whom it may concern:*

Be it known that I, DANIEL L. LEWIS, citizen of the United States, residing at Dayton, in the county of Montgomery and State of Ohio, have invented certain new and useful Improvements in Pipe-Couplings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in pipe couplings.

The object of the invention is to provide an effective and economical pipe coupling for joining the sections of pipe lines.

In the accompanying drawings: Figure 1 is a longitudinal mid-sectional view through the coupling and the adjacent ends of two pipe sections. Fig. 2 is a cross-section on the line $x$—$x$ of Fig. 1. Fig. 3 is a cross-section on the line $y$—$y$ of Fig. 1. Fig. 4 is a cross-section on the line $z$—$z$ of Fig. 1.

In describing the invention in detail similar reference characters will be employed to indicate the same parts in the specification and drawings.

1—1 designate the adjacent ends of two pipe sections which are coupled or united by means of my improved coupling.

This coupling consists of a sleeve, the middle portion 2 of which is of smaller diameter than the portions extending from the middle portion, and which forms the ends 3—3. The middle portion of said sleeve has a suitable number of recesses 4 on its exterior for the engagement of a wrench, to hold said sleeve, and the inner surface of said sleeve has a suitable number of stops 5 to arrest the insertion of the pipe ends within the coupling. The inner diameter of the middle portion of the sleeve is just sufficient to admit of the insertion of the pipe ends. Between the ends of the coupling sleeve and the pipe sections are suitable spaces for the reception of packing 6. The interior of the ends of the coupling sleeve has a suitable number of internal screw threads 7.

8 designates two rotary glands which are provided with exterior screw threads 9 engaging those on the interior of the sleeve. The pipe sections pass through these rotary glands, and the extreme outer ends of said glands beyond the ends of the coupling sleeve are provided with suitable projections and recesses 10 for the engagement of a spanner wrench with which said glands may be turned to tighten their ends against the packing. It will be observed from Fig. 1 of the drawings that the diameters of the portions of the rotary glands on a line through the threads is less than the diameter of the coupling sleeve on a line through the female portions of the screw threads, and that likewise, the diameters through the screw threads of the coupling sleeve will be greater than the diameter of the female portions of the screw threads of the rotary glands, and also the widths of the female portions of the screw threads of both the coupling sleeve and the rotary glands are greater than the widths of the threads. This permits the glands to have a longitudinal and lateral, as well as rotary movement in the sleeve. The threaded portions of the sleeve, measured to the bottom of the channels, are of greater internal diameter than the extreme outer diameter of the threaded portion of the gland, measured to the points of the thread,—this construction allows the gland to have the small amount of side motion, or a slight tilting out of alinement with the other parts, so as to adjust itself to inequalities in the thickness of different portions of the packing material. This inequality of thickness is very liable to exist when fibrous packing material is used and wrapped around the pipe, or when any material is used for packing that is not entirely homogeneous, or that is not molded into the exact form of the cavity to be filled. As the coupling is designed to unite pipe sections subjected to enormous pressure, great care is necessary that the packing be everywhere subjected to uniform pressure. Another advantage derived from making the channel between the threads wider than the threads designed to traverse them,—is that such construction allows a forward and backward motion of the gland without turning it, and the use of this is, to permit a tamping of the packing while under pressure, which is accomplished by applying force to the outer end of the gland. The gland is first screwed forward until the packing is quite firmly compressed. The resistance of the packing will bring the rear surface of the threads on the gland against a forward surface of the threads of the sleeve as shown in the drawings, and there will then be an open space ahead of the threads of the glands. This open space ahead of the threads of the gland allows said gland to be driven still farther ahead without turning it. After tamping, the gland may be turned again and the operation repeated as often as necessary to make a perfect fit. Between the packing and each gland there is placed a ring 11 which serves to reduce the friction between the glands and the packing, while said glands are being rotated, or screwed into the ends of the sleeve. The anti-friction rings 11, are preferably made of malleable iron.

In assembling the coupling and the pipe sections, the glands 8 are first placed upon the ends of the pipe sections 1, and the anti-friction rings and packing are next placed on said pipe sections in their relative positions as shown in Fig. 1. The ends of the pipe sections are then inserted in the coupling until arrested by contact with the stops 5 at the middle of said sleeve. The ends of said pipe sections are then drawn sufficiently away from said stops to allow for expansion. The coupling sleeve is held firmly at its center by means of a wrench, engaging the recesses 4, and the rotary glands are screwed into the ends of the sleeve, and the packing compressed as much as possible by the rotary action of said glands. The glands are then driven against the packing to further compress said packing by tamping said glands. The enlarged space between the internal screw threads of the sleeve and the external screw threads of the rotary glands, before referred to, is such as to allow a further longitudinal movement of said glands within the sleeve, as well as lateral movement. After this tamping of the rotary glands, they may be given further rotary movement to tighten them against the rings and packing.

The packing to be employed may be either non-elastic commercial packing or elastic packing such as rubber or composition which, however, will be permanently maintained under the compression to which it is subjected under the influence of the tamping action by the subsequent rotary movement of the gland. Thus the tamping tends to overcome the friction or break the tenacity of an elastic packing while the rotary movement of the gland permanently holds the compression or advance achieved by the tamping. For best results, especially when a high degree of compression is to be attained or during the final tightening effort, a spanner is preferably applied and placed under tension before the gland is tamped. As the gland is tamped to place the packing under compression it will immediately yield to the tension upon the spanner to permanently hold the packing in compressed condition.

It is possible in some connections to use only one rotary gland and thus dispense with the other, for example in coupling a T or L. Therefore, I do not wish to limit myself to the particular type of coupling sleeve shown and described.

Having described my invention, I claim:

1. In a pipe coupling, the combination with a coupling sleeve having internal screw threads, of an externally threaded gland insertible within the sleeve and adapted to receive the ends of the pipe sections to be coupled, an interposed permanently compressible packing the screw threads on said sleeve and gland being smaller in cross section than the intervening grooves whereby the loose screw threaded engagement of the gland with the sleeve will permit a longitudinal movement of the gland in relation with the sleeve independent of its rotary movement to enable the tamping of packing material within the sleeve.

2. In a pipe coupling the combination of a sleeve, a gland and an interposed collar of permanently compressible packing material, the sleeve and gland being provided with interengaging screw threads, the screw threads on one of said members being smaller in cross section than the cross section of the intervening grooves of the same member whereby the loose screw threaded engagement of the gland and sleeve will permit a relative longitudinal movement independent of their relative rotary movement of sufficient magnitude to enable the tamping or swaging of the interposed packing material by said longitudinal movement independent of the pressure to which the packing material is subjected by the relative rotary movement of the sleeve and gland.

In testimony whereof I affix my signature, in presence of two witnesses.

DANIEL L. LEWIS.

Witnesses:
R. J. McCarty,
Matthew Siebler.